Figure 1:
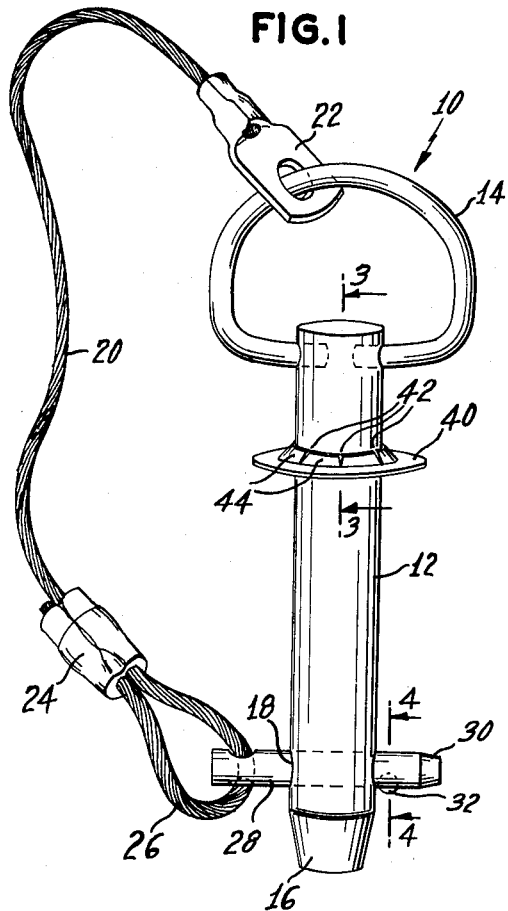

Aug. 17, 1965  W. H. DICKMAN  3,200,690
DEVICES FOR CONNECTING WORKPIECES
Filed Nov. 14, 1963

*INVENTOR.*
WALTER H. DICKMAN
BY Jerome Bauer
ATTORNEY

United States Patent Office 3,200,690
Patented Aug. 17, 1965

3,200,690
DEVICES FOR CONNECTING WORKPIECES
Walter H. Dickman, 6 Darby Drive,
Huntington Station, N.Y.
Filed Nov. 14, 1963, Ser. No. 323,856
1 Claim. (Cl. 85—7)

This invention relates to devices for connecting workpieces together and in particular to such devices including quick release or quick disconnect pins that facilitate the connection and disconnection of workpieces.

Quick release devices find application wherever it is necessary to releasably join together two or more working parts. Where working parts must be connected together to perform their function and then disconnected to eliminate the performance of their function or to permit them to perform a different function, it has been found that quick disconnect devices are extremely helpful. This is so because they permit the rapid and easy connection of such working pieces and their disconnection as well. Frequently, it is necessary that one or more of the connected or joined workpieces be permitted to pivot about the connecting pin. In the past, there has been a problem in this regard. It frequently happens that the joining pin of the quick release device works its way loose from the joined workpieces. This results from the forces exerted upon the pin by the relatively moving, pivoting workpieces. Moreover, because of this quick release devices are generally adapted to accommodate working pieces of only limited sizes.

An object of this invention is to provide a device by which two or more workpieces may be connected together to enable the same to accomplish their normally intended functions, but which device cannot be displaced from the workpieces without intentional manual disengagement from the workpieces. Thus, the present invention eliminates the possibility of accidental displacement of the quick release device from the workpieces.

Another object of the invention is to provide a quick release device that is double acting whereby the pin connecting the workpieces together is itself prevented from disconnection therefrom by its cooperation with a second quick release pin that requires manual operation for its removal.

Still another object of the invention is to provide a quick release device that is adaptable to properly connect together a range of workpieces of different sizes and to supportingly limit the sidewise movement of such workpieces with respect to the axis of the connecting device.

Accordingly, a feature and object of the invention resides in the details of construction where, by the use of a limiting structure that is operably adjustable, the working space of the connecting device can be varied to accommodate workpieces of different sizes.

Figure 2:
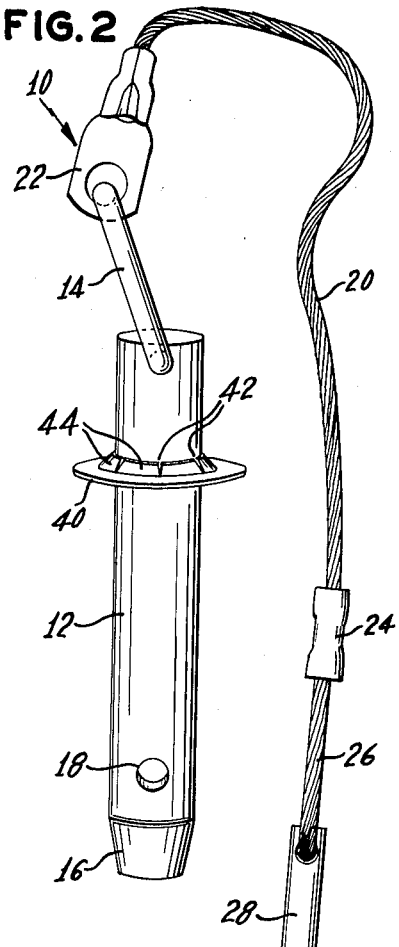
Figure 4:
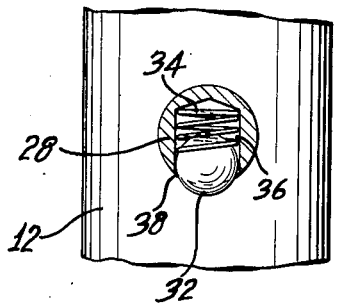
Figure 3:
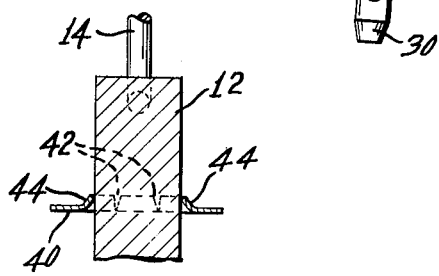

Other and further objects of this invention reside in the structures and arrangements hereinafter more fully described with reference to the accompanying drawing in which:

FIG. 1 is a front perspective view of a workpiece connecting device constructed according to the teaching of the invention in its operative condition, FIG. 2 is a side perspective view of FIG. 1 illustrating the device in its inoperative condition, FIG. 3 is a partial cross section view of FIG. 1 taken along lines 3—3, and FIG. 4 is a partial cross-section of FIG. 1 taken along lines 4—4.

Referring now to the drawing, the workpiece connecting device is generally identified by the numeral 10. It comprises a connecting pin 12 whose body is uniformly round in cross section and elongated in length. The length of the body of the connecting pin 12 is sufficiently long to accommodate a whole range of workpieces of different sizes. Generally, such workpieces (not shown) are provided with an aperture through which the elongated connecting pin body 12 is adapted to be inserted.

The connecting pin 12 is adapted to be manipulated at its rear or back end by grasping a ring-shaped element 14. The ring element 14 is pivotally mounted at the rear or back end of the connecting pin 12 while the opposite end of the pin is tapered to a narrower size as at 16. The tapered forward end 16 being narrower in diameter than the remainder of the connecting pin 12 enables the connecting pin to seek its entry and to be inserted into the aperture of workpieces without difficulty, quickly and easily. Defined in the forward end of the connecting pin body 12 is a through opening 18 that is positioned adjacent the taper 16. The through opening 18 is adapted to receive a lock pin therein and for passage therethrough.

Connected with the manually engageable ring 14 fixed to the connecting pin 12 is a wire or other flexible linkage 20. In the drawings, the flexible connecting linkage 20 is illustrated in the form of a braided wire. However, those skilled in the art will readily recognize that any other flexible form of connection may be utilized. The flexible connection 20 has a crimped connector element 22 slidably mounted on the ring 14. The opposite end includes a crimped element 24 that forms a suitable loop 26 on the flexible connector 20. Mounted on the loop 26 is a lock pin 28. In the present illustration, the loop 26 extends through an opening defined in the rear of the lock pin 28.

The lock pin 28 is adapted to be received within the confines of the through opening 18 provided in the forward end of the connecting pin body 12. For this reason, its body is sufficiently elongated in length to extend beyond both ends of the opening and is of such configuration and size as to fit smoothly yet not too loosely within the opening 18. In order to enable rapid and easy insertion of the lock pin 28 into the opening 18, the forward end thereof has a narrowing taper 30. To assure the retention of the lock pin 28 within the opening 18, the same is provided with a locking detent ball 32.

The locking ball detent 32 projects beyond the surface confines of the body of the lock pin 28, as is seen more clearly in FIGS. 1, 2 and 4. It is constantly urged into its projecting position by the spring element 34 that is located therebehind and positioned within a blind hole 36 defined in the body of the lock pin 28 as shown in FIG. 4. The locking ball detent 32 is prevented from projecting too far beyond the confines of the lock pin 28 by the surrounding wall of the blind hole 36 that is peened over at 38 to form a narrower diameter about the entranceway of the hole 36. The peened entranceway 38 thus retains the ball 32 in constant engagement with the urging spring 34 behind it. In consequence, any pressure applied to the ball 32 will cause the same to retract into the blind hole 36 in opposition to the spring 34 therebehind.

Slidably mounted for adjustment on and along the length of the connecting pin body 12 is an essentially flat washer-shaped limiting element 40. The flat face of the element 40 is positioned facing in the direction of the forward end of the connecting pin 12 and faces the lock pin receiving opening 18. The limiting element 40 is constructed much in the nature of a lock washer in that its radial inner portion is provided with a plurality of cuts or slits 42 which render the radial interior portion of the washer resilient and somewhat flexible. The slits 42 result in the provision of a plurality of spaced engaging means in the form of tangs 44.

The tangs 44 are deflected from radial alignment with the solid flat body of the washer-shaped limiting element 40 when positioned on the body 12 as shown in FIG. 3.

The tangs 44 are adapted to permit the limiting element 40 to slide along the length of the connecting pin body 12 from the rear toward the forward end thereof while snugly engaging the body of the same. However, if a force is applied against the flat workpiece facing surface of the limiting element 40, the resilient engaging means 44, already engaging the body 12, will automatically dig more deeply into the surface of the body of the connecting pin.

In actual use, the workpiece connecting device 10 is normally in its inactive position such as shown in FIG. 2. The washer-shaped limiting element 40 is usually initially located proximate the rear end of the connecting pin 12 adjacent the ring element 14. When the device 10 is employed to connect together two or more workpieces, the connecting pin 12 is inserted at its forward narrowed end 16 into the apertures normally present in such workpieces. Thereafter, the lock pin 28 is manually inserted into the receiving opening 18 provided at the forward end of the connecting pin 12.

As the lock pin is manually pushed into the opening 18, the ball detent 32 is caused to retract into its blind hole 36 against the opposition of the spring 34. However, as the locking pin is pushed through the opening 18 and the ball 32 approaches the other end of the opening 18 and moves therebeyond, it is automatically projected to its full detent position as shown in FIGS. 1 and 4. Thus, the projecting locking ball 32 engages the defining wall of the opening 18 and prevents the lock pin 28 from accidental dislodgement from the opening 18. Thereafter, the only way that the lock pin 28 can be removed from its engagement with the connecting pin 12 is by a manual force applied either directly to the pin 28 or to the flexible connector 20.

When once the lock pin 28 is in its described locking position as shown in FIG. 1, it serves as a bearing for one side of the workpieces mounted on and connected together by the connecting pin 12 and prevents them from sliding axially off the forward end of the pin. Thereafter, the limiting element 40 may be adjustably moved along the length of the body of the connecting pin 12 to engage the opposite side of the workpieces. Thus, the cooperation of the limiting element 40 and the lock pin 28 is such that they define a space between them the distance of which can be adjustably varied to accommodate a whole range of different sizes of workpieces. In practice, the limiting element 40 is often adjusted relative to the lock pin receiving opening 18 a distance sufficient to accommodate the workpieces that will be positioned between them on the connecting pin body 12. However, the limiting element 40 may be adjusted relative to the lock pin 18 after the same is engaged in the opening 18 and after the workpieces are positioned on the body 12.

During the performance of work by the workpieces mounted on the connecting pin 12, the limiting element 40 and the lock pin 28 define sidewise limiting walls and bearings for the same. In the performance of their functions as side bearings, they also serve as guides to prevent excessive canting of the workpieces on the connecting pin 12 and, therefore, eliminate the possibility of damage to the workpieces. The connection of the workpieces by the device 10 is accomplished quickly and easily with a minimum of motion. The disconnection of the workpieces is similarly capable of being performed quickly, easily and without the requirement of mechanical skills. To do this, the lock pin 28 is manually pulled from the opening 18 thereby removing the obstruction at the forward end of the connecting pin 12. The workpieces are then slid off the connection pin 12 by a manual force applied to the pin at the ring 14.

If it is the desire to utilize the connecting device 10 to join other differently sized workpieces, the limiting element 40 may be moved forward or backward along the body of the pin 12. If it is to be moved backward, it is rotated slowly about the body in the same manner as threading a nut on a bolt. This rotating motion causes the engaging tangs 44 to act as a threaded follower enabling the limiting element 40 to be moved rearward along the body 12. However, the tangs 44 resist direct axial rearward forces of the kind that are applied to the limiting element 40 by the workpieces on the connecting pin 12 and they dig into the body of the pin to prevent the rearward movement of the element 40.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claim appended hereto.

It is noted that although the drawing illustrates a single locking detent 32, a plurality of such ball detents have been included in the lock pin 28 when the size of the lock pin permits. At times, especially when more than one ball detent 32 has been utilized, a block of rubber or other elastic material has been utilized in substitution for the resilient urging means or spring 34.

I claim:

A device for connecting workpieces together comprising a support pin member having an elongated body of uniformly round size, a permanent ring mounted on one end of said body by which the body may be manipulated, the other end of said body being tapered to a narrower size, a through opening in said body at the other end thereof adjacent said taper, a lock pin having a body portion thereof removably insertable through said opening, a blind hole in said body portion, a locking ball in said blind hole, a spring in said hole urging said ball beyond said body portion, said locking ball projecting beyond the confines of said portion for engagement with one of the defining walls of said opening when said body portion of said lock pin is extended therethrough, means connecting said ring and lock pin together, a washer shaped limiting element movable in one direction along said body of said support pin member to be adjustably positioned a desired distance from said lock pin when the body portion of said lock pin is extended through said opening, and resilient means on said limiting element operable to engage said body of said support pin member to secure said limiting means in its one direction of movement to its adjusted position.

References Cited by the Examiner
UNITED STATES PATENTS

| 1,675,277 | 6/28 | Roe | 85—50 |
| 2,401,976 | 6/46 | Simpson | 85—8.3 |
| 2,463,628 | 3/49 | Juel et al. | 85—7 |
| 2,577,319 | 12/51 | Feitl | 85—36 |
| 2,779,228 | 1/57 | Meepos et al. | 85—5 |

FOREIGN PATENTS

| 362,166 | 12/31 | Great Britain. |
| 666,562 | 2/52 | Great Brittain. |

EDWARD C. ALLEN, Primary Examiner.
DONLEY J. STOCKING, Examiner.